(12) United States Patent
Mai

(10) Patent No.: US 11,879,222 B2
(45) Date of Patent: Jan. 23, 2024

(54) OIL SPILL BARRIER

(71) Applicant: WOOSB LTD, Stoke-on-Trent (GB)

(72) Inventor: Tai Thanh Mai, Stoke-on-Trent (GB)

(*) Notice: Subject to any disclaimer, the term of this patent is extended or adjusted under 35 U.S.C. 154(b) by 34 days.

(21) Appl. No.: 17/554,279

(22) Filed: Dec. 17, 2021

(65) Prior Publication Data
US 2022/0106755 A1   Apr. 7, 2022

Related U.S. Application Data

(63) Continuation-in-part of application No. 16/633,723, filed as application No. PCT/GB2019/051010 on Apr. 5, 2019, now abandoned.

(30) Foreign Application Priority Data

Apr. 12, 2018  (GB) .................................... 1806059

(51) Int. Cl.
E02B 15/08          (2006.01)
(52) U.S. Cl.
CPC ........ *E02B 15/0814* (2013.01); *E02B 15/085* (2013.01)
(58) Field of Classification Search
CPC ...... E02B 15/08; E02B 15/0814; E02B 3/062; E02B 3/04; E02B 3/06; E02B 15/04; E02B 3/046
See application file for complete search history.

(56) References Cited

U.S. PATENT DOCUMENTS

| 3,499,291 A * | 3/1970 | Trygve ................ E02B 15/0885 405/72 |
| 3,645,099 A | 2/1972 | Saavedra et al. |
| 3,708,982 A | 1/1973 | Blockwick |
| 4,016,726 A | 4/1977 | Campbell et al. |

(Continued)

FOREIGN PATENT DOCUMENTS

| FR | 2433078 A1 | 7/1980 |
| GB | 1310398 A | 3/1973 |

(Continued)

OTHER PUBLICATIONS

CSE-Report-P003578GB00 _ search report GB File:CSE-Report-P003578GB00.

(Continued)

*Primary Examiner* — Carib A Oquendo
(74) *Attorney, Agent, or Firm* — Invention To Patent Services; Alex Hobson

(57) ABSTRACT

A barrier member for an oil spill barrier configured for retaining one or more weights when assembled or combined with a second barrier member to form a barrier unit. A first barrier member has a first side for facing away from the second barrier member and a second side opposite the first side for facing towards the second barrier member in the barrier unit, the second side includes a substantially planar area for abutment to the second barrier member. The second side has at least one recessed region for receiving the one or more weights, the recessed region being recessed from the second side in a direction towards the first side relative to a plane of the substantially planar area. The second side has first and second elongate half-channels disposed to opposing sides of the at least one recessed region.

18 Claims, 10 Drawing Sheets

(56) References Cited

U.S. PATENT DOCUMENTS

| | | | |
|---|---|---|---|
| 5,000,616 A | 3/1991 | Bell et al. | |
| 6,623,213 B1 * | 9/2003 | Maydew | E21D 11/08 |
| | | | 405/20 |
| 7,572,083 B1 * | 8/2009 | Bishop | E02B 3/062 |
| | | | 405/21 |
| 2003/0185629 A1 | 10/2003 | Yodock, Jr. et al. | |
| 2004/0120770 A1 * | 6/2004 | Miyazaki | E02B 15/0814 |
| | | | 405/63 |
| 2005/0271470 A1 * | 12/2005 | Rytand | E02B 3/06 |
| | | | 405/23 |
| 2007/0031193 A1 * | 2/2007 | Yodock | E02B 3/20 |
| | | | 405/63 |
| 2013/0108368 A1 * | 5/2013 | Bishop | E02B 15/0835 |
| | | | 405/63 |
| 2014/0199123 A1 * | 7/2014 | Poscich | E02B 15/08 |
| | | | 405/30 |
| 2018/0169977 A1 * | 6/2018 | Wu | B29C 70/44 |
| 2022/0025597 A1 * | 1/2022 | Brade | B28B 7/28 |

FOREIGN PATENT DOCUMENTS

| | | |
|---|---|---|
| GB | 2422580 A | 8/2006 |
| NO | 20130281 A1 | 8/2014 |
| WO | 2011133041 A | 10/2011 |

OTHER PUBLICATIONS

International Search Report and Written Opinion File: ISR-and-WO-P003578PC00.

* cited by examiner

OIL SPILL BARRIER

CROSS-REFERENCE TO RELATED APPLICATIONS

This application is a continuation in part of U.S. patent application Ser. No. 16/633,723, filed on Jan. 24, 2020 and currently pending, which is a national stage application of PCT application No. PCT/GB19/51010, filed on Apr. 5, 2019, which claims the benefit of priority to Great Britain application No. GB1806059,0, filed on Apr. 12, 2018, the entirety of all prior application listed are hereby incorporated herein by reference.

BACKGROUND OF THE INVENTION

Field of the Invention

The present invention relates to a barrier member for assembly with a second barrier member to form a barrier unit for an oil spill barrier, a barrier unit for an oil spill barrier, and an oil spill barrier.

Background

Oil spill barriers are used to prevent oil from spreading over water in the event of an oil spill. The barriers float on top of the water, extend beneath the water to some degree, and are used to contain floating contaminant oil. The barriers can be used to control the position of oil which may need to be diverted or deflected in wind or a water current to a position where it can be pumped or skimmed off the water. They are also used to prevent oil reaching, for example, beaches and populations of wildlife.

A typical oil barrier may comprise individual barrier units with an upper portion, less dense than water and a weighted bottom portion extending down into the water. The amount of weight can be selected to provide optimum buoyancy for the body of water where the barrier will be deployed. Freshwater is less dense than seawater, for example, so comparatively more weight is required for deployment of the barrier in seawater to achieve the same level of buoyancy. That is, to achieve a similar floating position, with a given portion of the barrier above water.

The weight is often provided inside each barrier units or provided in a protective cover. This prevents the weight from absorbing water during use, which would reduce the buoyancy of the barrier. This avoids exposing the weight to water, which may degrade the weight over time.

The amount of weight within the barrier may need to be altered when moved to a different location (i.e. to a different body of water) to provide a suitable buoyancy in water with a different density. It can be difficult and time-consuming to correctly change the amount of weight in each individual barrier unit of the barrier, particularly where sand or water is used as the weight.

Where a barrier is designed to accommodate different amounts of weight, the volume of air remaining inside the barrier needs to be accounted for when considering the buoyancy of the barrier and how much weight to include. The amount of air inside the barrier can affect how the barrier behaves in the water during use.

For use, the barrier units are connected together to provide a single oil barrier which may be of the order of 20 to 30 metres long. This may be achieved by connecting the barrier units with barrier connection members. In rough sea conditions, the barrier connection members may be at risk of disconnecting, potentially rendering the oil barrier useless. The individual barrier units may also heave and twist relative to each other, distorting the shape of the oil spill barrier, which can allow oil in the oil spill to escape containment.

It is an object of the present invention to provide an improved barrier and improved barrier components which substantially reduce or obviate the aforementioned problems.

SUMMARY OF THE INVENTION

According to a first aspect of the present invention, there is provided a barrier member (or half barrier member/barrier half-member) for an oil spill barrier, the barrier member being configured for retaining one or more weights when assembled or combined with a second barrier member to form a barrier unit, the first barrier member comprising:
- a first side for facing away from the second barrier member in the barrier unit;
- a second side opposite the first side of the barrier member for facing towards the second barrier member in the barrier unit, the second side including a substantially central area for abutment to the second barrier member, wherein the second side comprises:
- at least one recessed region for receiving the one or more weights, the recessed region being recessed from the second side in a direction towards the first side relative to a plane of the substantially central area,
- first and second elongate half-channels disposed to opposing sides of the at least one recessed region, at least part of the first elongate half-channel running along or adjacent to a first longitudinal edge of the second side, and at least part of the second elongate half-channel running along or adjacent to a second longitudinal edge of the second side.

The term "barrier member" should be interpreted to mean a first portion or first half of a barrier unit. The term "barrier unit" should be interpreted to mean an individual barrier for assembly with other barrier units to form an oil spill barrier. The term "oil spill barrier" should be interpreted to mean a plurality of individual barrier units connected together for containing or controlling an oil spill on water.

The term substantially in "substantially central area" means that the central area is disposed at least partially on a centreline of the barrier member. The central area may be centred on the centreline.

The barrier unit may be considered to comprise of a front barrier half and a rear barrier half. The front and rear members of the barrier unit may be connected by connection means or fixing means that passes through the front and rear members. The front and rear members may be considered to be discrete from each other, i.e. separate items which can be releasably joined together by the connection means.

One or more connection means or fixing means (or aperture(s) therefor), for barrier member to barrier member connections, may extend through the upper portion of the barrier member. That is, through an upper third of the barrier member.

One or more connection means or fixing means (or aperture(s) therefor), for barrier member to barrier member connections, may extend through a middle region portion of the barrier member. That is, through a middle third of the barrier member.

One or more connection means or fixing means (or aperture(s) therefor), for barrier member to barrier member connections, may extend through the lower portion of the barrier member, which may be through a lower third of the barrier member.

The connection means and/or apertures for the barrier member to barrier member connection(s) may be arranged along axes which are substantially parallel to each other. Substantially parallel means parallel enough to allow fixing means (e.g. screws or bolts) to join the members together to provide a barrier unit The barrier member to barrier member connection(s) are intended to resist disengagement of the barrier members.

The barrier member provides at least one open recess for inserting one or more weights prior to combining with a second barrier member. This allows the amount of weight to be easily customised to control the buoyancy depending on the density of water in which the barrier member is deployed.

The recess(es) may be sized to receive approximately half of the one or more weights.

The recess(es) may increase in recess depth in a direction away from the second side towards the first side. The recess(es) may be deepest at the point or region closest to the first side of the barrier member, or furthest from the second side.

The barrier member may include an upper portion which extends vertically above the waterline during use. The barrier member may include a lower portion which extends vertically below the waterline during use.

The first barrier member may include a longitudinal axis extending from a centre of a top lateral edge to a centre of a bottom lateral edge of the first barrier member. The longitudinal axis may be disposed substantially centrally between the first and second longitudinal edges of the second side. Substantially centrally means that the axis is spaced equidistantly from the two sides.

The central area may be substantially planar. That is, a majority of the area may be planar. The central area should be planar enough for engagement against a corresponding area of the other barrier member.

The barrier member may be connected to a second barrier member to form a barrier unit. The second barrier member may have similar features to the first barrier member.

The second barrier member may comprise a first side for facing away from the first barrier unit. The second barrier member may comprise a second side for facing the first barrier unit. The second side of the second barrier member may include a substantially central (preferably planar) area for abutment to the first barrier member.

The second side of the second barrier member may comprise at least one recessed region for receiving one or more weights (which may be parts of the same weight(s) as the first barrier member).

The at least one recessed region may be recessed from the second side in a direction towards the first side relative to a plane of the substantially central area.

The at least one recessed region of the second barrier member may correspond to the at least one recessed area of the first barrier member. Together, a pair of recessed regions in each half barrier may form at least one chamber when the first barrier member abuts the second barrier member for receiving one or more weights.

The second side of the second barrier member may further comprise a first elongate half-channel. The first elongate half-channel of the second barrier member may be disposed to a first (or left-hand) side of the at least one recessed region.

At least part of the first elongate half-channel may run along or adjacent to a first longitudinal edge (or left-hand edge) of the second side of the second barrier member. The first elongate half-channel of the second barrier member may correspond to the first elongate half-channel of the first barrier member. Together, the half-channels may form a first elongate channel for receiving a barrier-to-barrier connection means.

In the second barrier member, a second elongate half-channel may be disposed to a second (or right-hand) side of the at least one recessed region of the second barrier member. The second elongate half-channel may be disposed opposite the second elongate half-channel of the first barrier member.

At least part of the second elongate half-channel may run along or adjacent to a second longitudinal edge (or right-hand edge) of the second side of the second barrier member. The second elongate half-channel of the second barrier member may correspond to the second elongate half-channel of the first barrier member. Together, the half-channels may form a second elongate channel for receiving a barrier-to-barrier connection means.

The first and second barrier members may be substantially identical. That is, identical or nearly identical save for minor details or portions which engage in a complementary way like a protrusion and a recess. The overall size and shape may be about the same. As a result, only one type of barrier member may need to be provided or manufactured to form the barrier unit. This can reduce manufacturing costs.

The first barrier member may be substantially symmetrical about a central plane bisecting the barrier member into left and right halves. The term substantially symmetrical means that the halves are identical or nearly identical save for minor details or portions which engage in a complementary way like a protrusion and a recess (e.g. for co-operating with corresponding recess and protrusion on a second barrier member).

The at least one recessed region may be centred on the longitudinal axis of the second side. That is, centred on the plane bisecting one half of the barrier unit. As a result, when one or more weights is added to the at least one recessed region, a centre of gravity in the middle of the barrier member may be easier to achieve.

One or both elongate half-channels may have a proximal end at the top lateral edge of the barrier member. One or both elongate half-channels may be open at the proximal end. This may allow a connecting member to be inserted in the proximal end of the elongate half-channel.

One or both elongate half-channels may have a distal end at or adjacent to the bottom lateral edge of the barrier member. One or both elongate half-channels may be closed at their distal end. This may prevent the connecting member from exiting the or each elongate half-channel through the distal end of the one or both elongate half-channels.

A through bore may be provided through either or both elongate half channels of the first barrier member for receiving at least one retaining member. The through bore(s) may pass through one or both elongate half-channels in the upper portion of the barrier member.

The through bore(s) may be disposed adjacent to the proximal end of the one or both elongate half-channels. This may allow a retaining member to be inserted through the through bore at the proximal end of the one or both elongate half-channels during use.

The proximal end(s) of either or both elongate half-channels may be open. The retaining member may block an open end of the one or both elongate half-channels during use, for preventing the connection means from exiting through the proximal end of the one or both elongate half-channels.

The first elongate half-channel and the second elongate half-channel of the first barrier member may be parallel to each other. This may facilitate insertion and movement of the connection means in elongate half-channels of separate barrier units.

The length of the first barrier member may be greater than the width of the first barrier member, wherein the length is the distance between the top lateral edge and the bottom lateral edge, and the width is the distance between the first longitudinal edge and the second longitudinal edge of the first barrier member.

The ratio of the length of the first barrier member to the width of the first barrier member may be greater than 2:1.

The or each half barrier member may be made by rotational moulding or by injection moulding.

The thickness of at least part of the upper portion of the first barrier member may be thinner than the lower portion of the barrier member. The at least one recessed region may be disposed in the lower portion.

Further optional features of the invention are discussed below.

The barrier may comprise a substantially rigid planar member made from plastics, and a weight attached to a lower end of the barrier, in use, the upper portion of the barrier extending vertically above the waterline and the lower portion of the barrier extending vertically beneath the waterline, in which the lower portion of the barrier is thicker than the upper portion of the barrier. Substantially rigid means that the planar member is rigid enough to maintain a planar shape in the water during use.

The barrier (or boom) does not require inflation, so it can be deployed into water much more quickly than existing inflatable booms, and begins providing effective containment even as it is being deployed. The lack of inflation means that the barrier remains effective in all water and weather conditions. This is because wind and waves cannot effect substantial lift on the barrier, since there is no air-filled (and hence lightweight) surface portion to act on. Using a rigid planar member also substantially prevents the barrier from becoming tangled up with other barriers when deployed in water, which can be problematic for conventional inflated booms even in normal sea and wind conditions.

The weight distribution in the barrier means that stays upright in the water on its own. That is, the lower portion is biased to a submerged position, and the upper portion extends out of the water in the same plane as the lower portion. Wind and waves can tilt the barrier member, but it returns to a substantially upright position of its own accord. Substantially upright means upright or almost upright (e.g. plus or minus 5 to 10 degrees from the vertical). The position of the weight in or at the lower end of the lower portion keeps the lower end underwater. However, the barrier member is high enough above the surface of the water to substantially prevent oil from spilling over the top, even in rough seas, and deep enough that it substantially prevents swells from causing oil to escape under the barrier. Substantially prevents means that most oil does not escape in a given instance of swell or wind or wave action.

The barrier is suitable for use in any body of water, such as a lake, sea or ocean, in any weather or water conditions. The boom is also suitable for use in areas of running water, such as a river or tidal estuary. Whilst the barrier is primarily aimed for use in containing an oil spill on water, the barrier does have other applications. For example, the barrier may be used to contain a chemical spill on water. In another example, the barrier may be used generally as a floating fence or collection area, for example to contain debris (typically plastic) being collected as part of a marine clean-up operation.

The lower portion may be thicker than the upper portion. The lower portion may be at least 1.5 times thicker than the upper portion. The lower portion may be substantially twice as thick as the upper portion. The lower portion may be substantially three times thicker than the upper portion. This lowers the centre of mass of the barrier, helping to ensure it remains upright in the water. It also minimises the tilting effect caused by wind acting on the exposed (above water) portion of the barrier. Substantially twice or three times the thickness means that slightly lower thicknesses, e.g. 1.9 or 2.9 times as thick, may be considered within the range.

The rigid planar member may be substantially symmetrical about a central vertical plane between its front and rear faces. That is, the front and rear halves of the barrier may be identical or very similar save for minor differences.

Front and rear faces of the lower portion of the rigid planar member may be substantially parallel to each other. Front and rear faces of the upper portion of the rigid planar member may be substantially parallel to each other. That is, parallel or almost parallel save for a few degrees difference.

The upper front face (that is, the front face of the upper portion) may be disposed closer to the plane of the upper or lower rear face than the lower front face (that is, the front face of the lower portion).

The upper rear face (that is, the rear face of the upper portion) may be disposed closer to the plane of the upper or lower front face than the lower rear face (that is, the rear face of the lower portion).

The upper portion may be substantially one third of the height of the barrier, and the lower portion may be substantially two thirds of the height of the barrier. Substantially one third means about 30% to 37.5% of the height. Substantially two thirds means about 62.5% to 70% of the height. This is very useful where the barrier is deployed in choppy waters. Having two thirds of the barrier under water substantially prevents oil from passing under the barrier, even in turbulent water. Where the lower portion is three times thicker than the upper portion, there is effectively a mass ratio of about 6:1 for the lower to upper portions of the planar member. This is before factoring in the weight in or attached to the lower end. This increases the inertia of the barrier, and increases the energy required to displace the barrier sufficiently for oil to escape containment.

A connection means may be provided in each side of the barrier. The connection means may comprise a tube extending along the side of the barrier. A longitudinal slot may be provided in the side of the tube. The connection means may allow a barrier to be connected to first and second barriers, one on each side. When a plurality of barriers are connected together, this can form a fence for containing an oil spill.

A flexible connection member may be provided for connecting first and second barriers together. The flexible connection member may comprise a sheet of waterproof fabric or material. The flexible connection member may have complementary connection means extending along each side of the fabric/material.

Using a flexible sheet allows the shape of the member to be manipulated. The connection members can in use establish smaller areas of calmer water (relative to the total area being contained by the fence). Oil can collect in (and optionally be collected from) these calmed areas. The distance between ends of the flexible connection member defines an entrance into the calmed area. The size of the entrance from the main area into the sheet-enclosed area depends on the degree to which the member is flexed or curved during use.

The complementary connection means may include cylindrical stems connected to the fabric. In use, the cylindrical stem of a flexible connection member may be located in a tube of the barrier, with the fabric/material extending through the slot. Preferably both cylindrical stems are identical, so that the flexible member can be used either way round.

The cylindrical stem can be slid into the tube to link the members. This provides a pivotal connection between the flexible member and the rigid planar member. When a series of members are linked together, this imparts some flexibility to the length of the barrier, and it can dissipate energy from waves and wind, reducing the risk of oil breaching containment. The connection between the planar and flexible members is also substantially leakproof, unlike existing booms. Substantially leakproof means very little fluid (water or oil) can pass through at any one time during use. The cylindrical stem of the flexible connection member is located in a correspondingly shaped tube in the side of the rigid member. The small gap between these parts, which allows rotation, is not large enough for oil to leak through the connection in any significant quantity. The sheet may also prevent oil getting into the tube, if the flexible member is rotated sufficiently relative to the rigid member.

The cylindrical stem is preferably weighted or connects to the barrier so that the flexible connection member is not separable from the barrier by waves or wind. A locking member may engage the stem once it has been inserted into the tube.

The lower portion of the barrier may be provided with an upthrust receiving area. The upthrust receiving area may be disposed at the base of the rigid planar member. The upthrust receiving area is considered to be horizontal, such that when the barrier is disposed vertically in water, it is substantially the only region with a horizontal component facing into the water. That is, any other faces of the barrier facing downwards are small enough that they generate little or no upthrust. The upper portion of the barrier may not include an upthrust receiving area. This means that the water can only exert an upwards force on the lower portion of the barrier. This reduces the likelihood of the barrier being lifted out of the water during rough weather, e.g. high winds and large swells, unlike inflated booms. Hence, the risk of oil being able to drain under the barrier is substantially mitigated, i.e. very little can drain under the barrier during use.

An aperture may be provided through the upper portion of the barrier. A cable can be passed through the aperture. Where multiple barriers are provided as part of a barrier arrangement, some or all of the barriers may be controlled using the cable. This makes it easier to pack up the barriers once an oil spill has been contained and cleared. In some cases, the cable can be used to give rise to a concertina effect. By controlling the cable, oil can be deliberately migrated from one part of the barrier arrangement to another for collection. This concertina effect can be considered as a form of peristalsis or controlled contraction of the barrier, for transferring the oil along the barrier.

The planar member may be made of solid plastics. Using plastics for the rigid planar member means that the barrier can float without the need for a foam filling, and without the need for internal air pockets (whether isolated or inflatable). For example, solid PVC may be used. Any material that is resistant to weathering by oil and seawater is suitable for this purpose, with the caveat that it should be sufficiently buoyant in water. However, in some cases, a solid outer shell with a foam filling may be provided. This minimises the weight of the member for transport.

The solid planar member may be made of plastics having a density lower than that of water.

The weight may have a density greater than that of water. The material and/or mass of the weight may be selected to complement the dimensions and/or specific plastic of the planar member. This allows the barrier to be correctly weighted for providing around one third of the height of the barrier above water, and around two thirds of the height of the barrier below water. This is preferred for barrier stability and preventing oil escaping over or under the barrier.

The barrier may have a compartment or chamber in which the weight is attached, secured or stored. The compartment may include a bore or slot in the lower portion of the planar member.

The compartment may include one or more sealing members to prevent water from entering the compartment. The planar member could be manufactured in such a way that the compartment is formed during the manufacturing process in the planar member.

The rigid planar member may include a member providing the upper portion, and secondary members to partially sandwiching that member on either side and providing the lower portion. The compartment may be provided by the outer planar members ending past the lower extent of the member forming the upper portion. The compartment may be partially open allowing the weight to come into contact with water. The compartment may be substantially enclosed around the weight by an additional planar member. Some small gaps may be present around the weight, particularly a mid-plane through the weight between the front and rear of the barrier unit.

The weight may be built into or part of the barrier. The weight may be attached to compartment through an attachment means. The attachment means may be an adhesive, a resin, or a fixing member. The weight may be attached to the compartment through friction fitting. The weight may be held in a region inset from the base of the rigid planar member.

The weight may extend the width of the rigid planar member or only extend part of the width of the rigid planar member. The weight may be distributed in a plurality of units. The weight may be located centrally between the front and rear faces of the barrier.

By having a sealed compartment for the weight, it ensures that the weight will not deteriorate as a result of prolonged contact with sea water or oil, for example. Furthermore, it helps to prevent the weight from being dislodged during vigorous motion. If, however, the compartment is not sealed, it allows for the weight to be changed as needed. The various means of attachment allow for similar functions.

The height of the barrier may be greater than the width of the barrier.

The flexible connection member may be wider than or about the same width as the barrier. If wider, it maximises the area of the flexible connecting members relative to the barriers, increasing the potential area of calmed zones for oil collection. If the same width, it reduces the propensity for the barriers and flexible connection members to become displaced from their original deployed configuration.

The flexible member may be substantially the same height as the rigid planar member. Some variation in height may be present but the flexible member should extend far enough above and below the waterline to mitigate against oil escaping the barrier under or over the flexible member.

A barrier arrangement or fence may be provided. The barrier arrangement may comprise a modular assembly two different types of units. The first unit may be a barrier according to the first aspect of the invention. The second unit may be a flexible connection member linking adjacent first units. The flexible connection member may have some or all of the features associated with the flexible connection member described above. The first and second units may be arranged in a repeating AB pattern (where A is the first unit and B is the second unit).

The barrier arrangement may comprise a plurality of barriers and a plurality of flexible connection members between adjacent barriers. The barrier arrangement may be provided as a kit, to be assembled on site. Alternatively, the barrier arrangement may be assembled prior to an oil spill occurring, and stored ready for deployment. As a preventative measure, the barrier arrangement can be provided around a ship (whilst docked) or around an oil rig during normal use of the rig, for example.

The barriers and flexible connection members may be connected in series in a regular alternating pattern. The barriers and flexible connection members may be arranged to form a plurality of minor areas as oil collection zones. The zones may be partially isolated from the major part of the area within the barrier arrangement.

Alternating between rigid planar members and flexible members means that the barrier arrangement can behave similarly at each region (i.e. subset of members) along its length. The minor areas that may be formed by the members (whether by a single member or a number of flexible and rigid members) are equivalent to the calmed or sheet-enclosed areas mentioned earlier.

Providing a pivotable/rotatable connection between the rigid planar members and the flexible members is preferred. It makes it easier to extend the barrier during deployment.

Each oil collection zone may be substantially V-shaped or trough-shaped when viewed from above. This allows the barrier arrangement to benefit from a concertina effect. Oil can collect in the zones and pumped out. When oil spill has been cleared, the barrier arrangement can be collected together easily by concertinaing the members together. As mentioned earlier, the concertina effect is a form of controlled contraction.

One or more cables may connect a given barrier to one or more adjacent barriers. The cables may be provided on one or both sides of the barrier. The cables strengthen the barrier, so that it remains intact under high stresses, e.g. during rough seas. Preferably, a cable connects the upper portions of the barriers, and another cable connects the lowers portions of the barriers.

Each flexible connection member may be wider than each of its neighbouring rigid planar members.

Each flexible connection member may be wider than each rigid planar member.

According to a second aspect of the invention, there is provided an oil spill barrier unit for an oil spill barrier, comprising:
 a barrier body with an upper portion for lying above waterline during use and a lower portion for lying below waterline during use;
 at least one chamber for receiving at least one weight inside the barrier body;
 a first barrier connection means on a first longitudinal side of barrier body;
 a second barrier connection means on a second longitudinal side of barrier body; and
 a fluid communication means between the at least one chamber and an exterior of the barrier body for, when the barrier unit is deployed in a body of water, allowing water from the body of water into the chamber.

The fluid communication means allows water from the body of water the barrier unit is disposed in to enter the chamber disposed within the barrier unit. As a result, during use, ballast may be disposed within the chamber wherein at least a portion of the ballast comprises water and a portion comprises solid ballast. The water may be from the body of water during use. By providing water from the body of water as a portion of the ballast, the weight of the ballast may adjust to the density of the water the barrier unit is positioned within. The water may also displace air from the chamber, improving how the barrier unit behaves in the water for containing an oil spill.

The first barrier connection means, and second barrier connection means may comprise at least one tube. The or each tube may extend along the or each longitudinal sides of the barrier unit. A longitudinal slot may be provided in the side of the or each tube. The first and second connection means may allow the barrier unit to be connected to a first and second complementary barrier connection means. When a plurality of barriers units are connected together, they may form a fence for containing an oil spill.

The fluid communication means may be fluidly connected to one or both of the first barrier connection means and second barrier connection means. This may allow the at least one barrier connection means to serve a dual purpose. The barrier connection means may serve as a barrier connection means and may form part of the fluid communication means.

The fluid communication means may allow air contained within the at least one chamber to be displaced by the water from the body of water which enters the at least one chamber during use. This allows the buoyancy of the barrier unit to be controlled.

The at least one weight may be made of a water-resistant material. This allows the at least one weight to resist degradation when immersed in water. For example, the weight(s) may be made of concrete, although other materials may be used in some embodiments.

The at least one weight may have a mass of at least 10 g. The or each weight may be a unitary mass of at least 10 g. The or each weight may be a unitary mass of at least 100 g.

The width of the at least one weight may correspond to the width of the at least one chamber. This may prevent the at least one weight moving sideways in the at least one chamber during use. If the at least one weight moved independently, the centre of gravity of the barrier unit may be affected which may affect the stability of the barrier unit.

The barrier unit may be made in at least two discrete parts. The barrier unit may be made from the first and second barrier member of the first aspect of the invention. The barrier unit may include any feature or combination of features presented with respect to the first aspect of the invention.

The at least two parts may be connected together by a fixing means, such as one or more screws or bolts. An interface between the at least two parts may not be watertight. The interface may provide at least part of the fluid communication means between the at least one chamber and the body of water. For example, an interface between planar areas (or abutted regions) of first and second barrier halves may allow water into the chamber.

According to a third aspect of the invention, there is provided an oil spill barrier for containing an oil spill on water comprising:
- a plurality of first barrier units;
- a plurality of second barrier units which are flexible connection members, wherein each second barrier unit connects a pair of neighbouring first barrier units together; and
- one or more retaining members for each retaining one of the second barrier units in connection with its pair of first barrier units, wherein the retaining member spans between at least one pair of first barriers above a top lateral edge of the second barrier unit(s).

The one or more retaining members may provide a second (or auxiliary) means of connecting neighbouring pairs of first barrier units. The one or more retaining members may prevent each second barrier unit from disconnecting from its pair of first barrier units.

By positioning the one or more retaining members above top lateral edges of the second barrier units, the one or more retaining member may inhibit vertical movement of each second barrier unit. The one or more retaining members may inhibit vertical movement without passing through the second barrier unit itself.

The first barrier units may comprise barrier members as described in the first aspect of the invention. The first barrier units may also or alternatively comprise barrier units as described in the second aspect of the invention.

The first barrier unit may comprise a first longitudinal edge. The barrier unit may comprise a second longitudinal edge. A first elongate channel may run along the first longitudinal edge of the first barrier unit. A second elongate channel may run along the second longitudinal edge of the first barrier unit.

The first and second elongate channels may receive a connection means on the second barrier unit. Each elongate channel may include a slot along its length. The slot may be disposed on the side of the elongate channel.

The elongate channel may allow a first barrier unit to be connected a second barrier unit on each side of the first barrier unit. When a plurality of first and second barriers units are connected together, this can form a fence or oil spill barrier for containing an oil spill.

The one or more retaining members may pass through a through bore in the first elongate channel of a first barrier unit and a through bore in the second elongate channel of a neighbouring first barrier unit. This may connect the pair of neighbouring first barrier units together and block an open side of each elongate channel, preventing the second barrier unit from disconnecting during use.

Each second barrier unit may comprise a flexible sheet. Flexible connection members provide the oil boom with some degree of flexibility. Each second barrier unit may comprise a PVC-coated flexible sheet. Any suitable material or coating may be used for mitigating the barrier unit absorbing oil.

Each second barrier unit may comprise a complementary connection means. The complementary connection means may include cylindrical stems connected to the flexible sheet. In use, the cylindrical stems of the second barrier unit may be located in the elongate channels of the first barrier unit, with the flexible sheet extending through the slot. Preferably both cylindrical stems are identical, so that the flexible member can be used either way round.

The one or more retaining members may have minimal elongation under tension. That is, the retaining member(s) may be substantially inextensible. That is, it may be able to stretch slightly but not by much, so that the barriers cannot change orientation relative to each other by more than a few degrees. This may prevent or restrict relative movement of the first barrier units in a plane of the barrier unit. For example, it may prevent the barrier units tilting away from each other, towards different first barrier units.

The one or more retaining members may restrict tilting of the first barrier units out of plane, away from each other. That is, the retaining member(s) may restrict opposing forward/rearward tilting of the paired barrier units.

The one or more retaining member may include one or more lengths of rope (which may also be referred to as fibre) or another similar elongate cable. The retaining member may comprise polyethylene, such as UHMWPE (ultra-high molecular weight polyethylene). For example, the retaining member may comprise DYNEEMA®.

BRIEF DESCRIPTION OF SEVERAL VIEWS OF THE DRAWINGS

For a better understanding of the present invention, and to show more clearly how it may be carried into effect, reference will now be made by way of example only to the accompanying drawings, in which.

DETAILED DESCRIPTION OF THE ILLUSTRATED EMBODIMENTS

Figure 1A:
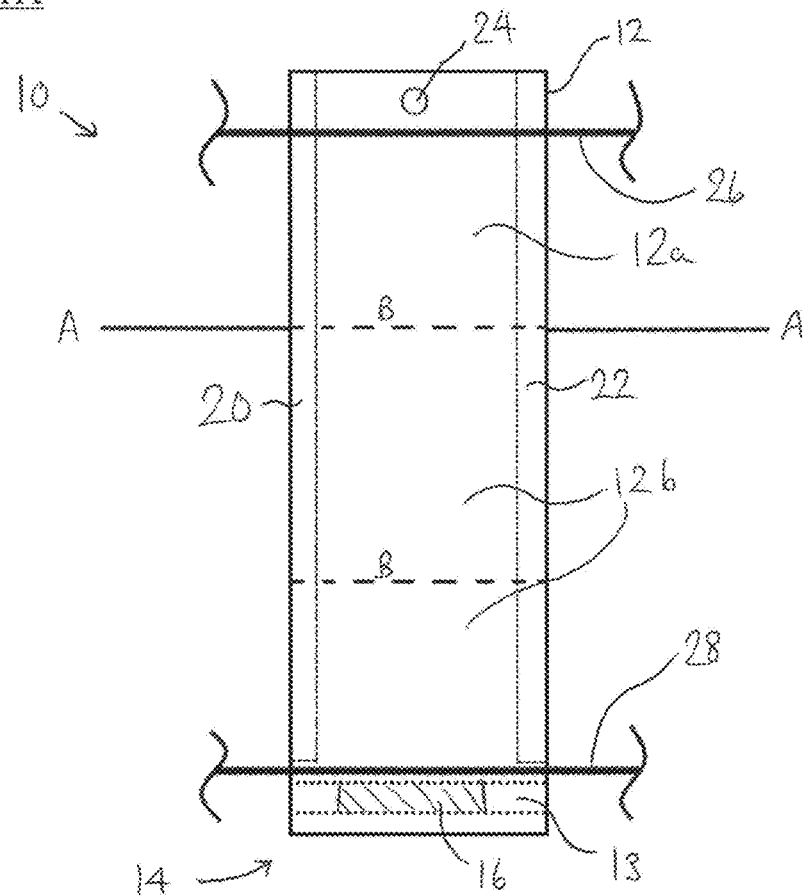
FIG. 1A shows a front view of a barrier member according to the second aspect of the present invention, afloat in water.
Figure 1B:
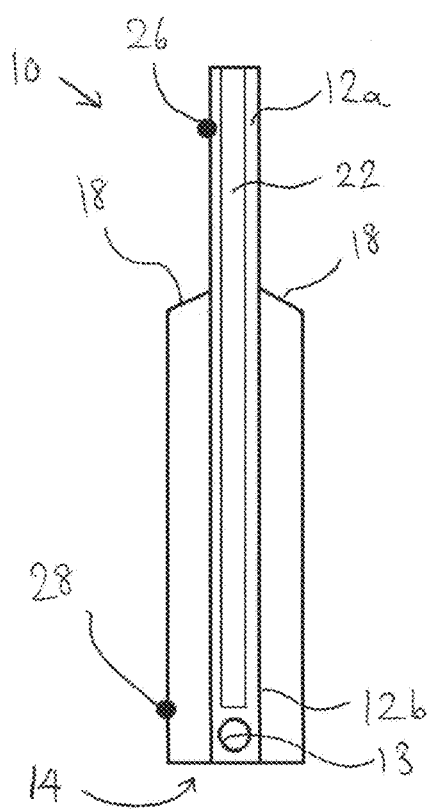
FIG. 1B shows a side view of the barrier member of FIG. 1A.

Referring firstly to FIGS. 1A and 1B, a barrier (or boom) is indicated generally at 10. The barrier 10 is floating in water, indicated by line A to either side of the barrier 10. The barrier 10 lies substantially upright in the water. In other words, the longitudinal axis of the barrier 10 is normal to the waterline A. The visible face of the barrier 10 is either the oil spill-facing side, or the side which faces away from an oil spill.

The barrier 10 includes a substantially rigid planar member 12. Dashed lines B show the planar member 12 divided into thirds for illustrative purposes only. The top third is an upper portion 12a of the barrier 10. The lower two thirds is a lower portion 12b of the barrier 10. It can be seen that, during use, the top third lies above the waterline A, and the remaining two thirds lie below the waterline A. The planar member 12 is made from solid PVC plastic in this embodiment.

The planar member 12 include a bore 13 through its lower end. The bore 13 extends from one side of the lower end to the other. The lower end is indicated generally at 14. A weight 16 is provided in the bore 13. The weight 16 fills part of the bore 13 in this embodiment. The material used for the weight 16, and the amount of that material are selected to enable the planar member 12 to float as illustrated. The weight 16 is metal in this embodiment. The weight 16 should be as low as possible in the lower end 14.

It is normally preferred to isolate the weight 16 from the sea water to prevent corrosion. Therefore, the weight 16 can be isolated inside the planar member 12 by sealing the bore. Note that although a bore 13 is used in this embodiment, it will be appreciated that a recess, slot or other form of receiving area or connection area for a weight may be used in other embodiments.

FIG. 1B shows the barrier 10 from the side. The lower portion 12b is three times as thick as the upper portion 12a. The top of the lower portion 12b includes angled surfaces 18 that slant to meet the surface of the upper portion 12a. It is apparent that the only surface which can receive upthrust from the water is at the lower end 14. There is no horizontal surface in the upper portion 12a which can receive an upwards force from the water. The lower end 14 is substantially flat in this embodiment.

The planar member 12 includes first and second tubes 20, 22 on either side. The tubes 20, 22 are substantially cylindrical in shape. Each tube 20, 22 is open at one side for receiving a flexible connection member. Each opening is narrower than the diameter of the corresponding tube. In this embodiment, the tubes 20, 22 have closed ends at a point above the bore 13. However, in other embodiments, if the weight is slotted in via the lower end 14 for example, then the tubes 20, 22 may continue down to the lower end 14. This is so that a lower end of the flexible connection member is provided at the same depth as the lower end 14 of the barrier 10.

The barrier 10 includes an aperture 24 running through the upper portion 12a. This aperture can have a cable (not shown) provided through it for use in deploying or stowing the barrier.

The barrier 10 includes upper and lower reinforcements in the form of cables 26, 28. The cables are made of nylon in this embodiment. The cables 26, 28 are attached to one side of the barrier 10. One cable 26 is connected to the upper portion 12a, and the other cable 28 is attached to the lower portion 12b. It will be appreciated that additional cables may be provided on the other side of the barrier in other embodiments. It will also be appreciated that the cables could be provided within the barrier, rather than on the surface. However, the position of the cables 26, 28 should be selected so as not to interfere with the flexible connection members (described below).

Figure 2A:
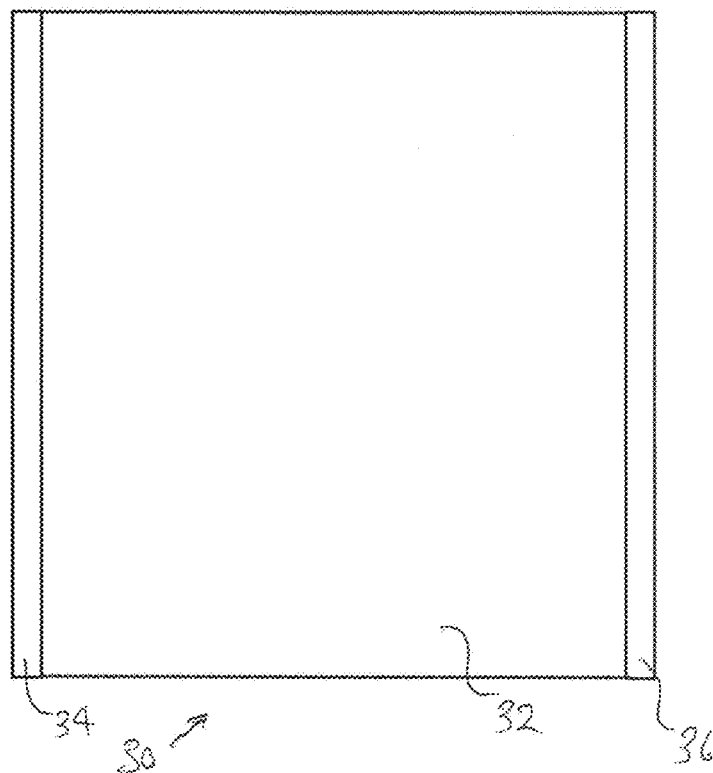
FIG. 2A shows a front view of a flexible connection member for connection to the barrier member of FIG. 1A.
Figure 2B:
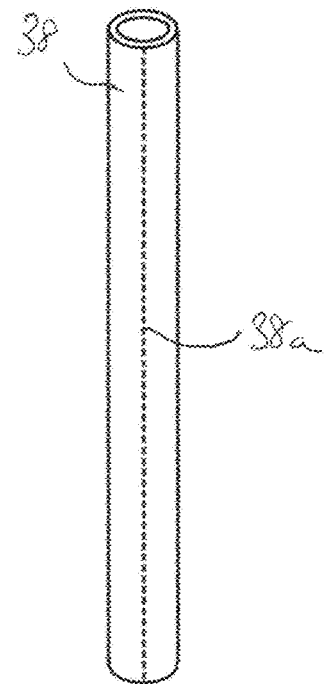
FIG. 2B shows a perspective view of a cylindrical stem of the flexible connection member of FIG. 2A.

Referring also to FIGS. 2A and 2B, a flexible connection member is indicated generally at 30. The flexible connection member includes a sheet 32 connected between first and second stems 34, 36. The stems 34, 36 are cylindrical and smaller in diameter than the tubes 20, 22.

The sheet 32 is made of a waterproof material. In this embodiment, the material is nylon. The stems 34, 36 each run the full length of opposite sides of the sheet 32. Each stem 34, 36 is hollow in the middle. Each stem 34, 36 includes a slot (not shown). The slot is made by cutting along the length of the stem. This allows the sheet 32 to be inserted and the stem to be secured to the sheet 32.

The sheet 32 is approximately square in this embodiment. In other embodiments, the sheet may be wider than it is tall. Alternatively, the sheet 32 may be narrower than it is tall.

A secondary stem 38 is shown in FIG. 2B. The secondary stem 38 is hollow. It includes a slot 38a along its length. The hollow portion of the stem 38 is sized to receive one of the stems 34, 36. The slot 38a is wide enough to receive the sheet 32. Another secondary stem 38 is provided for the other of the stems 34, 36. The outer dimensions of the secondary stem 38 match the dimensions of the tubes 20, 22.

Figure 3:
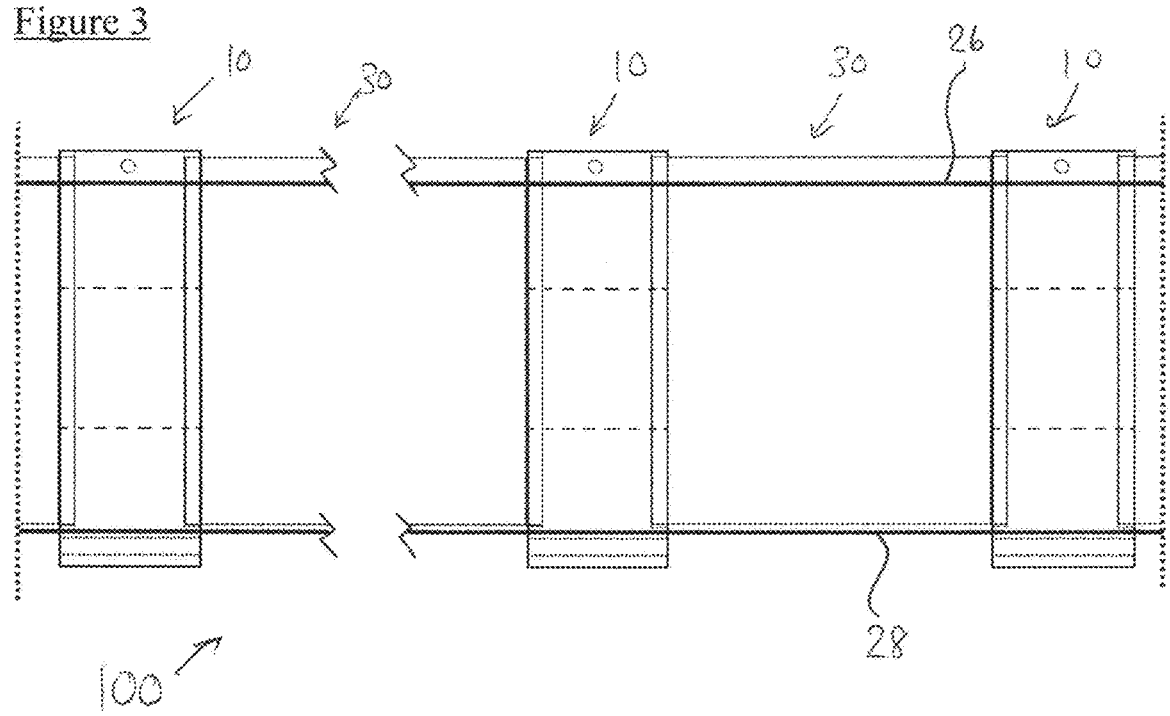
FIG. 3 shows a front view of barrier members according to FIG. 1A interconnected with flexible connection members according to FIG. 2A, forming a barrier.

Referring also to FIG. 3, part of a barrier arrangement is illustrated, indicated generally at 100. The barrier arrangement 100 is a modular fence constructed from a plurality of barriers 10 and a plurality of interstitial flexible connection members 30. The flexible connection members 30 may have different widths, as indicated by the indefinite length of one of the members 30.

Each barrier 10 is connected on either side to first and second flexible connection members 30. Similarly, each flexible connection member 30 is connected on either side to first and second barriers 10. All of the barriers 10 are connected together by the same nylon cables 26, 28. The height of the flexible connection members 30 above water is substantially the same as the tops of the barriers 10.

The barrier arrangement 100 is assembled as follows. First, secondary stems 38 are placed around the stems 34, 36 of the flexible connection member 30. One of the secondary stems 38 is then slid into a tube 20 of one barrier 10. This links the flexible connection member 30 to the first barrier. The other of the secondary stems 38 is then slid into the tube 22 of a second barrier 10. Further flexible connection members 30 and barriers 10 are then connected in a similar manner. The cables 26, 28 are attached to each barrier 10 as the assembly is put together. The barrier arrangement 100 may be rolled up on a reel for storage, for example.

When an oil spill occurs, the barrier arrangement 100 is then deployed by using it to encircle the spill region. Where a large oil spill needs to be contained, a number of barrier arrangements 100 may be connected together in series.

In this embodiment, the barrier arrangement 100 should be arranged to form V-shaped regions approximating a zig-zag configuration. The apex of each V-shaped region contains calmer water, close to the barrier arrangement 100, and so oil can collect there. The zig-zag pattern may be manipulated by using a cable through the apertures 24 in the barriers 10.

When the cause of the oil spill has been resolved, and no further oil is being spilt, the oil needs to be cleared up. The cable can be used to controllably contract the barrier arrangement 100. A winch mechanism may be used, for example. This closes up sections of the zig-zag configuration, where oil has collected. Consequently, although barrier arrangement may have a perimeter of many kilometres, oil can be transferred towards a single location for collection and disposal. This saves significant time and effort during clean-up operations. This also pulls in the barrier arrangement for storage after use.

Figure 4:
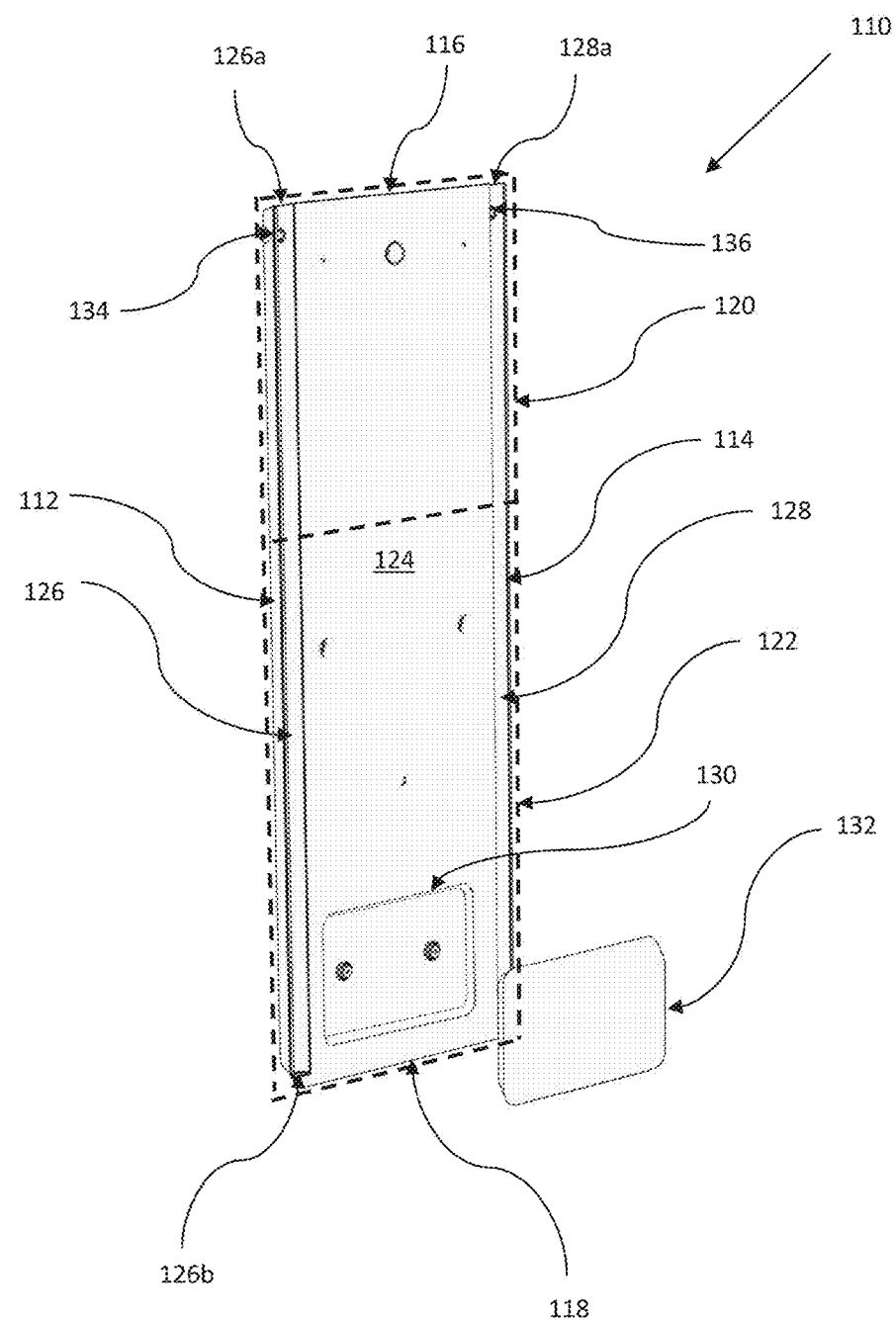
FIG. 4 shows a perspective view of a barrier member according to the first aspect of the present invention.

Referring now to FIG. 4, a first barrier member according to the first aspect of the invention is shown generally at 110.

In this embodiment, the first barrier member may form one part of a two-part barrier unit for an oil spill barrier.

The first barrier member 110 is substantially rectangular in profile. The barrier has a height to width ratio of at least 2:1. In this embodiment, the height to width ratio is around 3:1.

The first barrier member has a first longitudinal edge 112 and second longitudinal edge 114. The first and second longitudinal edge 112, 114 are opposite each other. Each longitudinal edge extends from a top lateral edge 116 of the barrier member to a bottom lateral edge 118 of a barrier member. The top and bottom lateral edges 116, 118 are opposite each other.

An upper portion 120 (demarcated by imaginary dashed lines, which are shown for reference only) is provided extending from the top lateral edge 116 in a direction towards the bottom lateral edge 118. The upper portion 120 extends in a direction towards the bottom lateral edge 118 by about one third of the length of the longitudinal edges 112, 114. The upper portion 120 extends vertically above the waterline during use. The upper portion 120 prevents oil from an oil spill flowing over the barrier member 110 during use.

A lower portion 122 (demarcated by imaginary dashed lines, which are shown for reference only) is provided extending from the bottom lateral edge 118 in a direction towards the top lateral edge 116. The lower portion 122 extends in a direction towards the top lateral edge 116 by about two thirds of the length of the longitudinal edges 112, 114. The lower portion 122 extends vertically below the waterline during use. The lower portion 122 prevents oil from an oil spill flowing under the barrier member 110 during use.

The first barrier member has a first side. During use, the first side is a sea-facing (or water-facing) side and faces away from a second barrier member (140, see FIG. 5). A second side 124 is provided on an opposite side of the barrier member 110 from the first side. During use, the second side 124 is a barrier-facing side and faces the second barrier member (140, see FIG. 5).

The second side 124 includes a substantially planar central area. A portion of the planar area is in the upper portion of the second side, and another portion of the planar area is in the lower portion of the second side. During use, the second side 124 abuts a second barrier member (140, see FIG. 5) to form a barrier unit (172, see FIG. 8).

A first elongate half-channel 126 is provided along the first longitudinal edge 112. The first elongate half-channel 126 extends from a proximal end 126a (or top end) disposed at the top lateral edge 116 towards a distal end 126b (or bottom end) disposed adjacent to the bottom lateral edge 118.

A second elongate half-channel 128 is provided along the second longitudinal edge 114. The second elongate half-channel 128 extends from a proximal end 128a disposed at the top lateral edge 116 towards a distal end (not shown) disposed adjacent to the bottom lateral edge 118.

The first and second elongate half-channels 126, 128 each have a cross-section which is substantially semi-circular. That is, shaped to be complementary enough to the exterior of a cylinder for receiving part of a cylindrical body.

The first and second elongate half-channels 126, 128 are substantially parallel to each other.

The first and second elongate half-channels 126, 128 are open at their proximal ends 126a, 128a to allow a barrier-to-barrier connection means to be inserted into the elongate half-channels 126, 128. The first and second elongate half-channels 126, 128 are closed at their distal ends 126b, 128b to prevent the barrier-to-barrier connection means from exiting the elongate half-channels 126, 128.

A recess 130 is provided on the second side 124 of the barrier member, in between the elongate half-channels 126, 128. During use, the recess 130 receives one or more solid weights 132. The weights 132 are discussed in more detail below. The recess 134 is centred on a longitudinal axis wherein the longitudinal axis extends from the centre of the top lateral edge 116 to the centre of the bottom lateral edge 118 (i.e. when viewing the second side face-on). By being centred on the longitudinal axis, it is easier to maintain the centre of gravity in the centre of the barrier member when the weight is located in the recess. The recess 130 is recessed relative to the plane of the second side 124, in a direction towards the first side of the first barrier member.

The first barrier member 110 is substantially symmetrical about a plane bisecting the barrier member 110.

Through bores 134, 136 are provided through the elongate half-channels 126, 128, adjacent to the proximal ends 126a, 128a of each elongate half-channel 126, 128 of the first barrier member 110. The through bores 134, 136 are each substantially perpendicular to the elongate half-channels in this embodiment, although they may be at other angles relative to the half-channels in other embodiments.

In this embodiment, the through bores 134, 136 are disposed between about 1 cm to 10 cm from the top lateral edge 116. However, in other embodiments the through bores 134, 136 may be disposed at any point through the elongate half-channels 126, 128 in the upper portion 120 of the first barrier member 110 or the lower portion thereof. The through bores 134, 136 allow a retaining member (176, see FIG. 9) to be passed through the elongate half-channels 126, 128, blocking the open proximal ends 126a, 128a during use.

A U-shaped section (138, see FIG. 5) is disposed on the first side of the barrier member, in the upper portion. The U-shaped section (138, see FIG. 5) extends from the top lateral edge 116 in a direction towards the bottom lateral edge 118. The U-shaped section (138, see FIG. 5) extends by approximately a third of the length of each longitudinal edge 112, 114. The U-shaped region (138, see FIG. 5) is recessed from the first side of the barrier member 110, in a direction towards the second side 124 of the barrier member 110.

Figure 5:
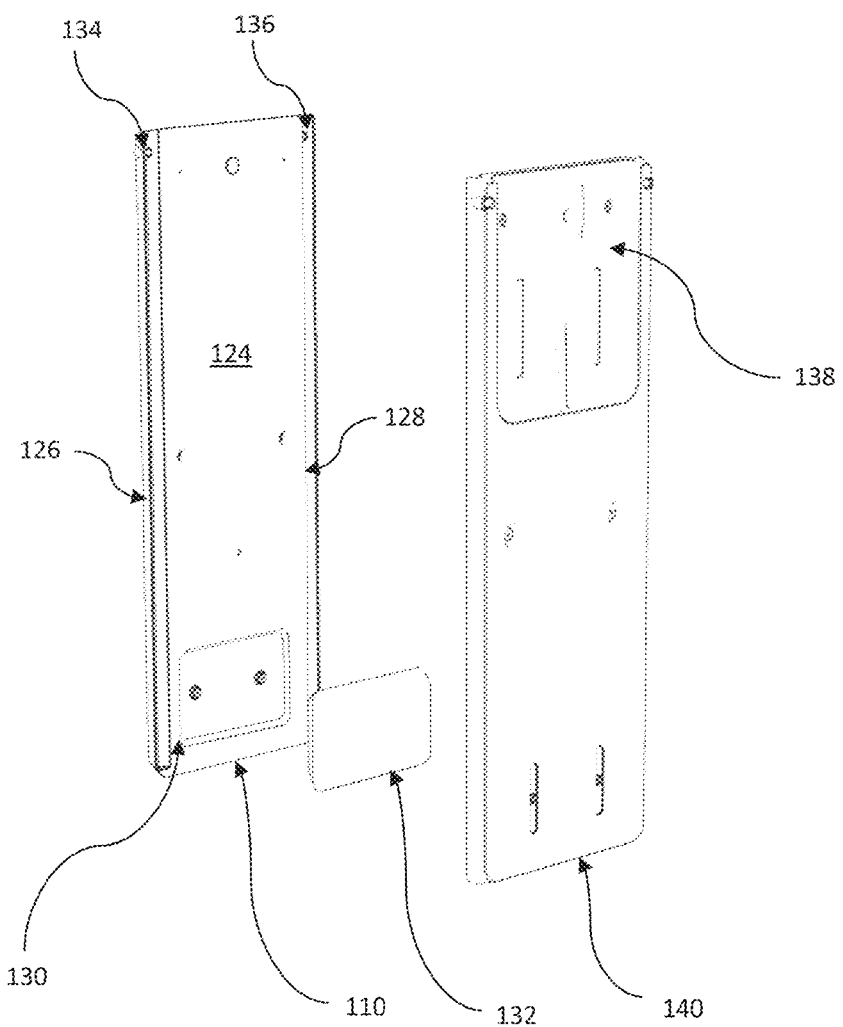
FIG. 5 shows an exploded perspective view of a barrier unit comprising the first barrier member of FIG. 4 and a second barrier member, and a weight.

Now referring to FIG. 5, a perspective view of the first and second barrier members 110, 140 are shown. In this embodiment, the second barrier member 140 is identical to the first barrier member 110. As the first barrier member 110 is symmetrical about a longitudinal plane and the second barrier member 140 is identical to the first barrier member 110, when they are assembled as a barrier unit, the elongate half-channels 126, 128 and recesses 130 of each barrier member align with their respective counterpart in the other barrier member. This is described further below.

Several apertures (not labelled) through each barrier member align in the barrier unit for receiving fixing means such as screws or bolts to hold the barrier unit together. There are two apertures in the upper portion and two or four in the lower portion of each barrier member for this purpose in the current embodiment.

The second side 124 of the first barrier member 110 and second side (not shown) of the second barrier member 140 abut to form a two-part barrier unit. As the barrier members 110, 140 abut to form a two-part barrier unit, they are substantially parallel to each other.

When the second side 124 of the first barrier member 110 abuts the second side of the second barrier member 140, the first elongate half-channel 126 of the first barrier member 110 and corresponding elongate half-channel of the second barrier member 140 align to form a first elongate channel in a first longitudinal edge of the two-part barrier unit. The first elongate channel forms a first connection means for a first barrier connection member.

Additionally, the second elongate half-channel 128 of the first barrier member 110 and corresponding elongate half-channel of the second barrier member 140 align to form a second elongate channel in a second longitudinal edge of the two-part barrier unit. The second elongate channel forms a second connection means for a second barrier connection member.

The recess 130 of the first barrier member 110 and recess of the second barrier member 140 align to form a single chamber within the barrier unit. This chamber is centred on a longitudinal axis of the barrier unit. The longitudinal axis of the barrier unit extends from the centre of a top lateral edge of the barrier unit to the centre of a bottom lateral edge of a barrier unit. In this embodiment, this chamber houses an individual weight 132.

The weight 132 in this embodiment has the shape of a square bifrustum, although other shapes of weight or weights may be provided in other embodiments. Each half of the square bifrustum is receivable in a correspondingly shaped recess of each barrier half.

The width of the weight 132 is substantially similar to the width of the recesses 130. This is to prevent the weight 132 from moving sideways in the chamber of the barrier unit which may affect the centre of gravity.

In this embodiment, the weight 132 is made from concrete. Concrete has water-resistant properties which mitigate degradation of the weight when submerged in seawater. In other embodiments, the weight may be made from any material or combination of materials which may be suitably water-resistant or durable.

Figure 6:
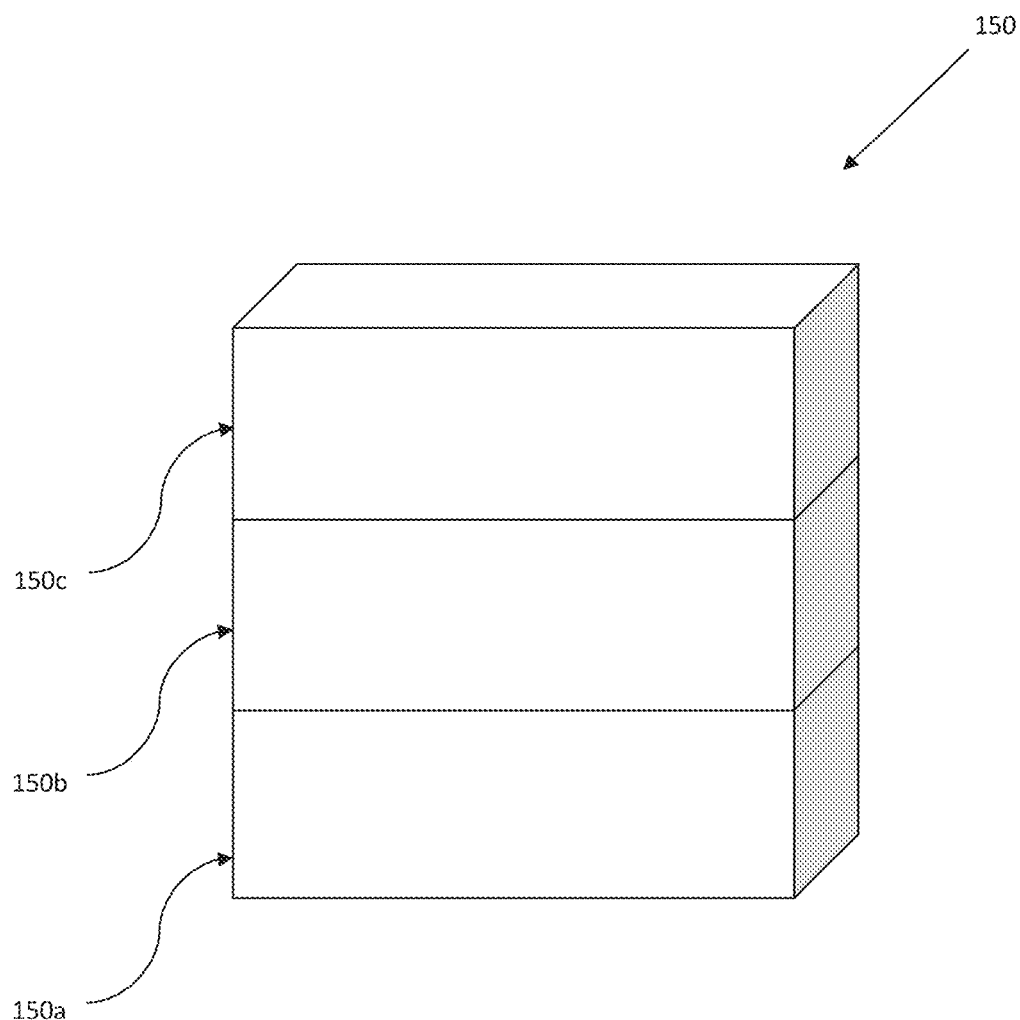
FIG. 6 shows a perspective view of a plurality of weights according to the present invention.

In other embodiments, a plurality of stackable weights may be provided (150, see FIG. 6).

Referring to FIG. 6 a plurality of stackable weights is generally indicated at 150. The plurality of stackable weights contains 3 individual weights, namely 150a, 150b and 150c, although other numbers of individual weights may be provided in other embodiments. By providing the weight in multiple parts, the mass of the solid ballast in the chamber can be customised to control the buoyancy of the barrier member 110.

In this embodiment, the stackable weights 150abc are substantially identical. This makes it simpler to achieve a desired amount of weight as the mass of individual weights is known. In other embodiments, the mass of the weights 150abc may not be identical. For example, the weights may vary in shape to fit to a particular shape of chamber in the barrier unit.

The width of the weights 150abc are substantially similar to the width of the recesses 130. This is to prevent the weights 150abc from moving sideways in the chamber of the barrier unit which may affect the centre of gravity.

Figure 7:
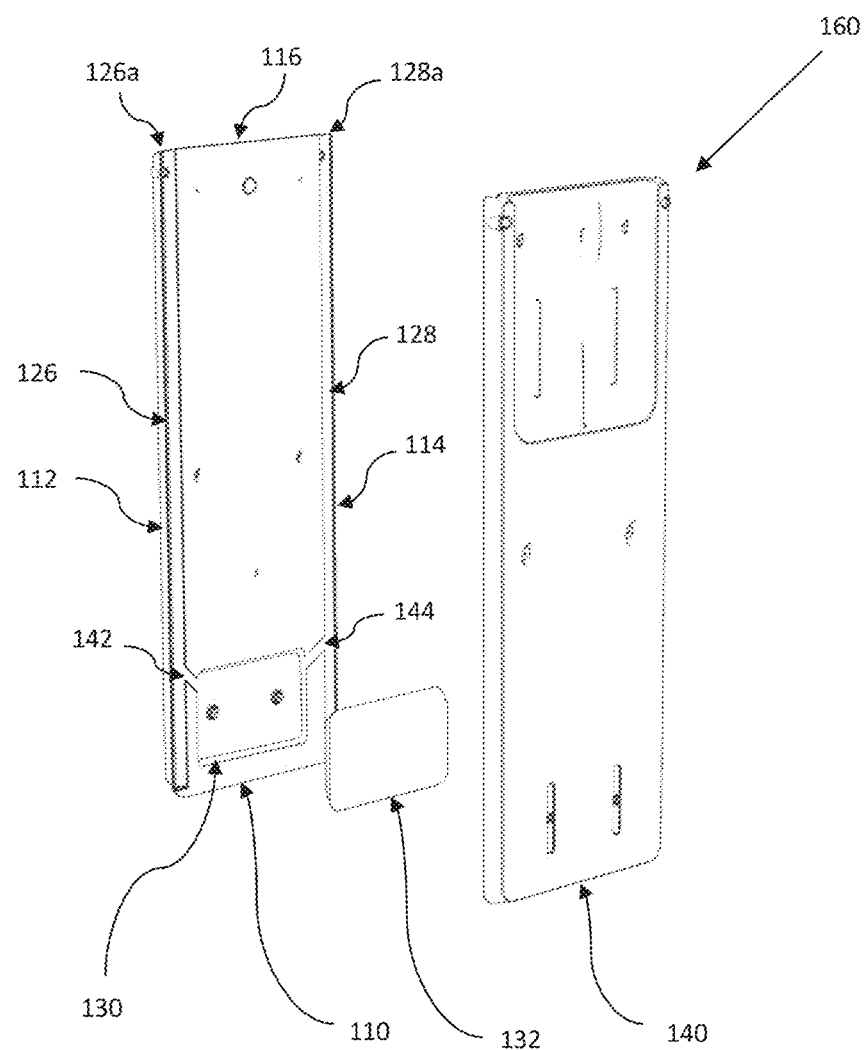
FIG. 7 shows an exploded perspective view of a barrier unit according to the second aspect of the present invention.

Referring to FIG. 7, an exploded view of a barrier unit according to the second aspect of the invention is generally indicated at 160. In this embodiment, the barrier unit is formed from two barrier members 110, 140 and an individual weight 132 as described above. In this embodiment, each barrier member 110, 140 contains a fluid communication means between their respective recesses 130 and the body of water the barrier unit is deployed in during use.

In this embodiment, the interface where the elongate half-channels 126, 128 of the first barrier member 110 and the elongate half-channels of the second barrier member 140 abut is not water-tight.

During use, water from the body of water the barrier unit is deployed in can enter the elongate channels in the longitudinal edges of the barrier unit.

Secondary elongate conduits or half-channels 142, 144 are provided extending from the first and second elongate half-channels 126, 128 of each barrier member 110, 140 to the chamber. It will be appreciated that in embodiments where the barrier unit is not made from multiple barrier members, the half-channels may be considered to be channels.

In this embodiment, the secondary elongate half-channels 142, 144 diverge from the elongate half-channels 126, 128 in each longitudinal edge 112, 114 at an angle between 30° to 60° from the direction of the elongate half-channels 126, 128. In other embodiments, this angle may be between 0° and 90°.

It will be appreciated that the linear half-channels depicted in FIG. 7 are not the only possible implementation of the fluid communication means. The half-channels (or channels/conduits, as the case may be) may be disposed at any suitable position and angle, and may have any shape and length suitable for allowing water to flow into the chamber from the surrounding body of water, during use.

The secondary elongate half-channels 142, 144 in each barrier member 110, 140 abut to form secondary elongate channels in the barrier unit. This allows freshwater or seawater in the elongate channels of the barrier unit to flow through secondary elongate channels and enter the chamber during use. The freshwater or seawater within the chamber forms a portion of the ballast during use.

By providing secondary elongate channels on either side of the chamber, water may enter the chamber evenly from both sides of the barrier unit, allowing the barrier unit to substantially maintain its centre of gravity relative to the longitudinal axis of the barrier unit. That is, maintain it close enough to the axis to keep it upright.

In other embodiments, open proximal ends 126a, 128a of the elongate half-channels 126, 128 at the top lateral edge 116 of the barrier members 110, 140 may provide means for the seawater to enter the elongate half-channels 126, 128. In other embodiments, the chamber itself may not be water-tight, allowing freshwater or seawater to enter the chamber without necessarily passing through secondary elongate channels.

Figure 8:
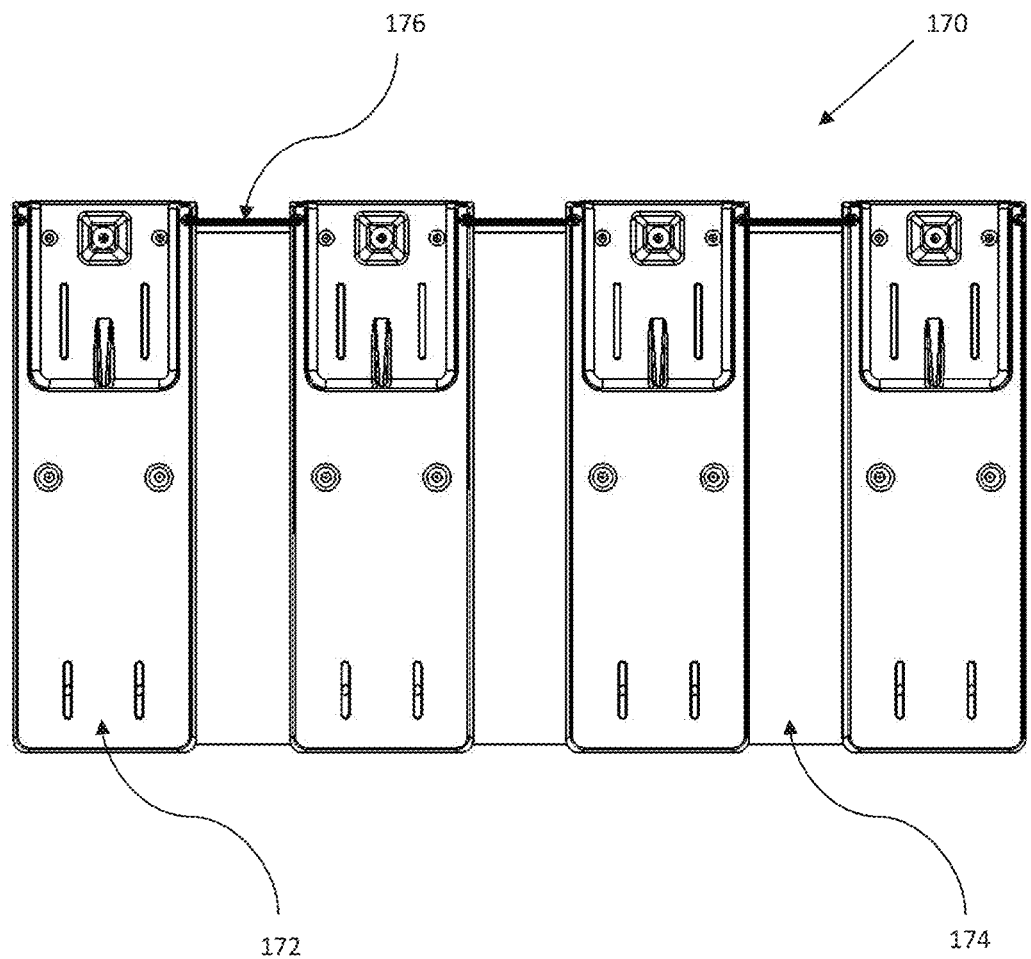
FIG. 8 shows a front view of an oil spill barrier comprising first and second barrier units and retaining members, according to the third aspect of the present invention.

Now referring to FIG. 8, part of an oil spill barrier arrangement according to the third aspect of the invention is generally indicated at 170. The oil spill barrier arrangement includes a plurality of first barrier units 172, connected by a plurality of second barrier units 174 and a plurality of retaining members (one of which is indicated at 176), each retaining member retaining each respective second barrier unit 174 in connection with its pair of first barrier units 172.

It will be appreciated that only part of the oil spill barrier arrangement is shown, and the oil spill barrier may include any number of first and second barrier units and retaining members in an arrangement similar to the portion depicted in FIG. 8.

The second barrier units 174 are disposed between the first barrier units 172, spacing apart the first barrier units 172.

In this embodiment the first barrier unit 172 is as described in the embodiment of the first aspect of the invention. In another embodiment the first barrier unit 172 is as described in the embodiment of the second aspect of the invention. Reference is made to the barrier member and barrier unit described with respect to FIGS. 4 to 7.

Figure 9:
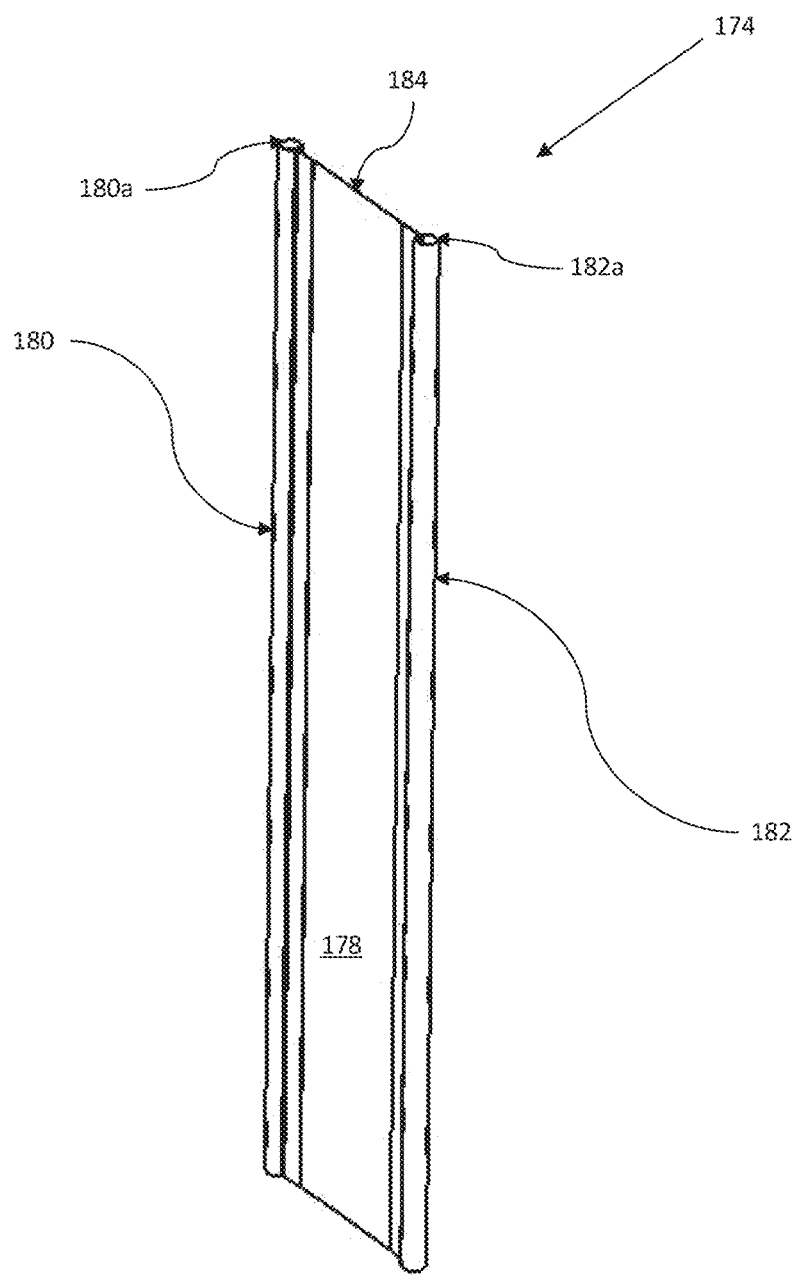
FIG. 9 shows a perspective view of one of the second barrier units of FIG. 8.

The second barrier unit 174 is shown in FIG. 9. The second barrier unit 174 is a flexible connection member. The second barrier unit 174 includes a sheet 178 connected between first and second stems 180, 182. The stems 180, 182 are cylindrical and smaller in diameter than the elongate channels of the barrier unit.

The sheet 178 is made of a waterproof material. In this embodiment, the material is nylon. The stems 180, 182 each run the full length of opposite sides of the sheet 178. Each stem 180, 182 is hollow in the middle. Each stem 180, 182 includes a slot (not shown). The slot is made by cutting along the length of the stem 180, 182. This allows the sheet 178 to be inserted and the stem 180, 182 to be secured to the sheet 178.

The sheet 178 is narrower than it is tall in this embodiment. In other embodiments, the sheet 178 may be wider than it is tall. Alternatively, it may be approximately square.

To assemble the flexible connection member with a pair of barrier units, the first stem 180 is inserted into the first elongate channel of a first barrier unit 172 and the second stem 182 is inserted into the second elongate channel of a neighbouring first barrier unit, thereby connecting the neighbouring first barrier units together.

The cylindrical stems 180, 182 have a proximal end 180a, 182a where the proximal end is the end closest to a top lateral edge 184 of the second barrier unit.

Figure 10:
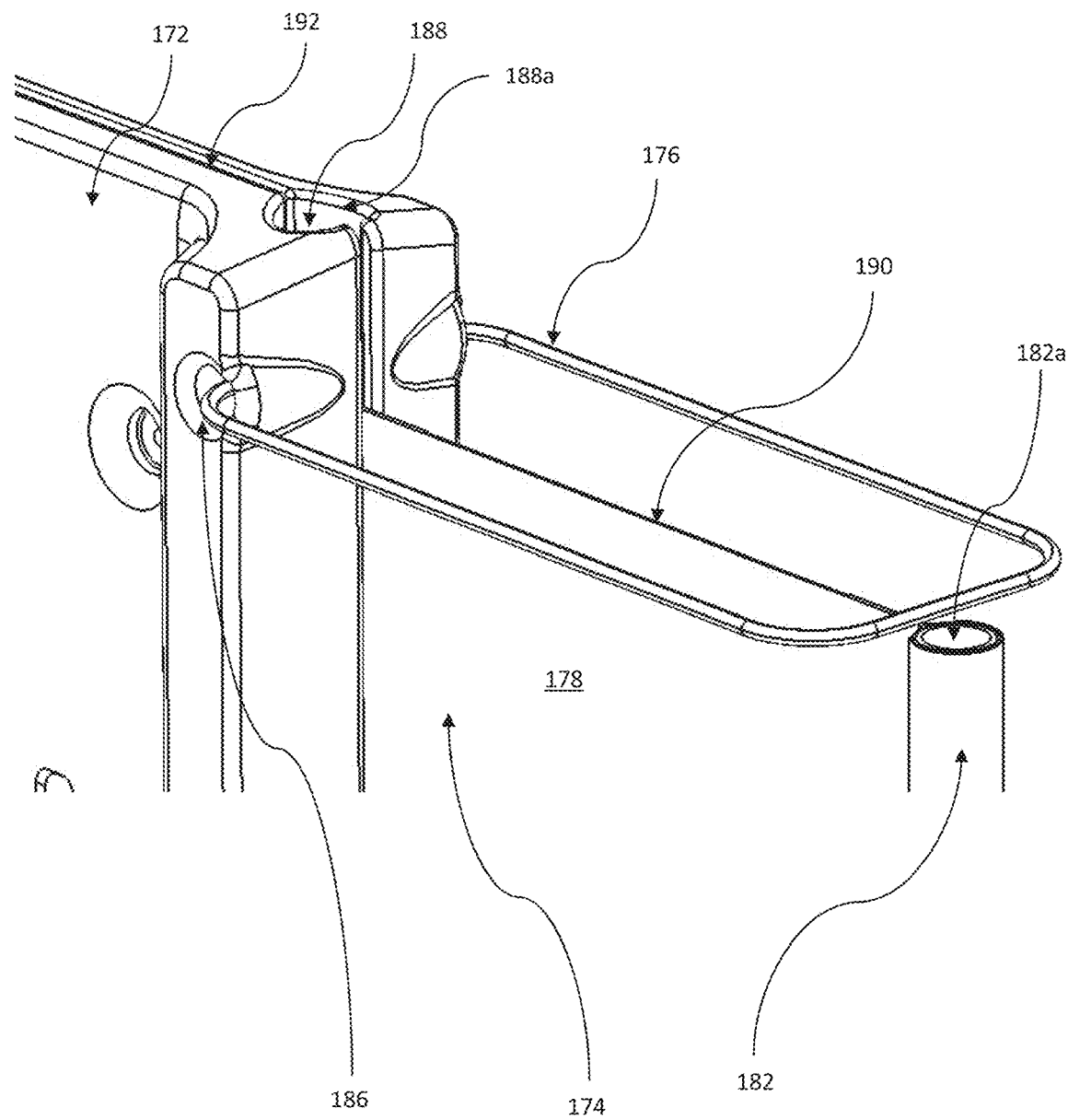
FIG. 10 shows a perspective view of one of the retaining members of FIG. 8, in situ with parts of first and second barrier units.
Figure 11:
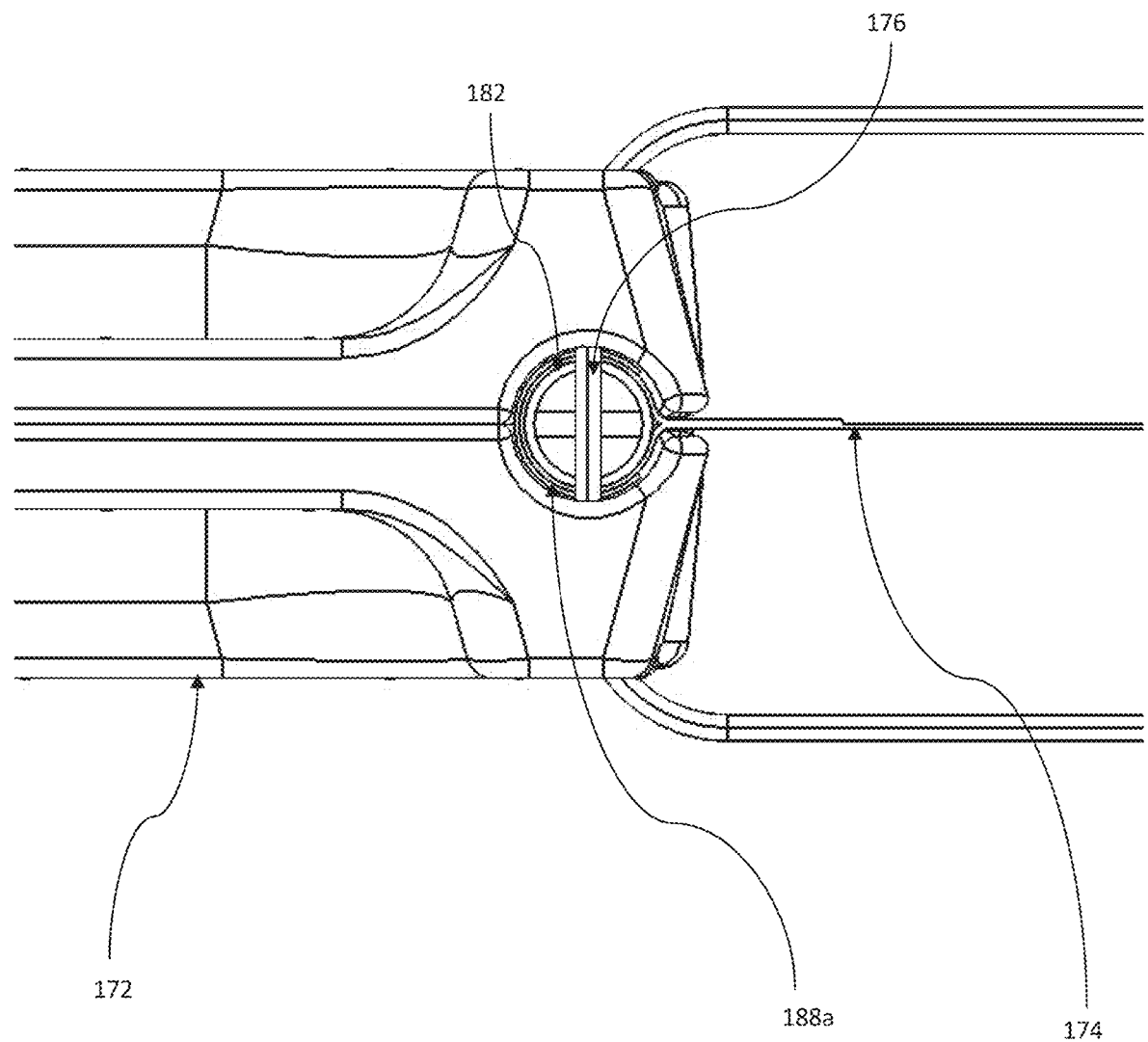
FIG. 11 shows a plan view of the retaining member and barrier unit parts of FIG. 10.

The cylindrical stems 180, 182 of the second barrier unit 178 are retained by the respective retaining members 176. One of the retaining members 176 is shown in FIGS. 10 and 11. In this embodiment, the retaining member 176 is a length of rope or fibre. The rope or fibre is made from nylon. Rope or fibre provides a flexible retaining member 176. It also has minimal elongation or stretching under tension.

Referring to FIG. 10, the retaining member 176 passes through an elongate channel 186 or through bore. The channel 186 in this case is perpendicular to a vertical plane of the barrier unit.

The perpendicular elongate channel 186 is disposed through the second elongate channel 188 of the first barrier unit 172. It will be appreciated that similar channels or through bores are provided for each left and right side of each barrier unit in this embodiment.

The retaining member 176 is disposed above the top lateral edge 190 of the second barrier member 174 between the first longitudinal edge of the first barrier unit 172 and the second longitudinal edge of a neighbouring first barrier unit. This provides a second member for connection a first barrier unit 172 and a neighbouring first barrier unit.

Each elongate channel 188 has a proximal end 188a where the proximal end 188a is the end closest to the top lateral edge 192 of the first barrier unit 172. The perpendicular elongate channels 186 are disposed closer to the proximal ends of the elongate channels 188a than the proximal ends of cylindrical stems 180a, 182a are to the proximal ends of the elongate channels 188a. When the retaining member 176 passes through the perpendicular elongate channel 186 in the elongate channel 188, the retaining member 176 does not pass through the second barrier unit 174, as shown in FIG. 11.

The retaining member 176 is tied at either end (not shown). It will be appreciated that any suitable securing means may be used for creating a loop or otherwise retaining the retaining member in engagement with the barrier units.

The retaining member 176 prevents the cylindrical stems 180, 182 of the second barrier units 174 exiting the tops of the elongate channels 188 during use.

These embodiments are provided by way of example only, and various changes and modifications will be apparent to persons skilled in the art without departing from the scope of the present invention as defined by the appended claims.

What is claimed is:

1. A barrier member for an oil spill barrier, the barrier member being a first barrier member which is configured for retaining one or more weights when assembled or combined with a second barrier member to form a barrier unit, the first barrier member comprising:
   a first side for facing away from the second barrier member in the barrier unit;
   a second side opposite the first side of the first barrier member for facing towards the second barrier member in the barrier unit, the second side including a central area for abutment to the second barrier member, wherein the second side comprises:
      at least one recessed region for receiving the one or more weights, the at least one recessed region being recessed from the second side in a direction towards the first side relative to a plane of the central area of the second side;
      first and second elongate half-channels being parallel to each other and disposed to opposing sides of the at least one recessed region, at least part of the first elongate half-channel running along or adjacent to a first longitudinal edge of the second side, and at least part of the second elongate half-channel running along or adjacent to a second longitudinal edge of the second side.

2. The barrier member of claim 1, and the second barrier member which is discrete from the first barrier member, the second barrier member being connected to the first barrier member to form the barrier unit, wherein the second barrier member comprises:
   a first side for facing away from the first barrier member in the barrier unit;
   a second side opposite the first side of the second barrier member for facing towards the first barrier member in the barrier unit, the second side of the second barrier member including a central area for abutment to the first barrier member, wherein the second side of the second barrier member comprises:
   at least one recessed region for receiving the one or more weights, the at least one recessed region of the second barrier member being recessed from the second side of the second barrier member in a direction towards the first side of the second barrier member relative to the plane of the central area of the second side,
   first and second elongate half-channels being parallel to each other disposed to opposing sides of the recessed region of the second barrier member, at least part of the first elongate half-channel of the second barrier member running along or adjacent to a first longitudinal edge of the second side of the second barrier member, and at least part of the second elongate half-channel of the second barrier member running along or adjacent to a second longitudinal edge of the second side of the second barrier member.

3. The barrier member as claimed in claim 1, in which the first elongate half-channel includes a first open end, the second elongate half-channel includes a second open end, and one or both of the first and second open ends are disposed at a top lateral edge of the first barrier member.

4. The barrier member as claimed in claim 1, in which one or both of the first elongate half-channel and second elongate half-channel terminate at or adjacent to a bottom lateral edge of the first barrier member.

5. The barrier member as claimed in claim 1, in which the at least one recessed region is centred on a longitudinal axis of the barrier member, wherein the longitudinal axis is disposed centrally between the first and second longitudinal edges of the second side.

6. The barrier member as claimed in claim 1, including one or both of:
   a first through bore for receiving a first tether or retaining member for connection to a first neighbouring barrier member or barrier unit, the first through bore provided through a wall of the first elongate half-channel; and
   a second through bore for receiving a second tether or retaining member for connection to a second neighbouring barrier member or barrier unit, the second through bore provided through a wall of the second elongate half-channel.

7. The barrier member as claimed in claim 1, wherein there is a first distance from a top lateral edge of the barrier member to a bottom lateral edge of the barrier member, and a second distance from the first longitudinal edge of the second side to the second longitudinal edge of the second side, wherein a ratio of the first distance to the second distance is at least 2:1.

8. The barrier member as claimed in claim 1, in which the barrier member comprises an upper portion which extends vertically above a waterline during use, and a lower portion which extends vertically below the waterline during use, wherein at least part of the upper portion of the barrier member is thinner than the lower portion of the barrier member.

9. An oil spill barrier unit for an oil spill barrier, comprising:
   the first barrier member as claimed in claim 1;
   a barrier body including an upper portion for lying above a waterline during use and a lower portion for lying below the waterline during use;
   at least one chamber disposed inside the barrier body for receiving a weight or ballast;
   a first barrier connection means in or on a first longitudinal side of the barrier body;
   a second barrier connection means in or on a second longitudinal side of the barrier body; and
   at least one fluid communication means between the at least one chamber and an exterior of the barrier body for, when the barrier unit is deployed in a body of water, allowing water from the body of water into the at least one chamber.

10. The oil spill barrier unit as claimed in claim 9, wherein the at least one fluid communication means is connected to, or fluidly communicates with, one or both of the first barrier connection means and the second barrier connection means.

11. The oil spill barrier unit as claimed in claim 9, in which the barrier body comprises at least two barrier body parts, connected together by at least one fixing means, wherein the at least one fluid communication means includes an interface between the at least two barrier body parts which is not watertight, and the interface meets or fluidly communicates with the at least one chamber for allowing water between the at least two parts to occupy at least part of the at least one chamber during use.

12. The oil spill barrier unit as claimed in claim 9, in which the weight or ballast comprises one or more individual weights, wherein the or each of the one or more individual weights has a mass of at least 10 g.

13. The oil spill barrier unit as claimed in claim 12 wherein a width of the or each of the one or more individual weights is the same as to a width of the at least one chamber.

14. The oil spill barrier unit as claimed in claim 9, in which a first portion of the ballast comprises one or more solid weights, and during use the one or more solid weights occupy part of the at least one chamber and some or all of a remaining space in the at least one chamber is occupied by water.

15. An oil spill barrier for use in containing an oil spill on water, comprising:
   a plurality of first barrier units, wherein the plurality of first barrier units comprises at least one first barrier member as claimed in claim 1;
   a plurality of second barrier units which are flexible connection members, wherein each second barrier unit connects a neighbouring pair of the plurality of first barrier units together, spacing the neighbouring pair of first barrier units apart; and
   one or more retaining members for retaining the plurality of second barrier units in connection with respective pairs of the first barrier units, wherein the or each of the one or more retaining members spans between at least one pair of the first barrier units in a position above the or each second barrier unit connected between the at least one pair of the first barrier units.

16. The oil spill barrier as claimed in claim 15, in which the or each of the one or more retaining members includes a rope, or fibre, or flexible elongate cable.

17. The oil spill barrier as claimed in claim 15, in which at least one of the plurality of first barrier units comprises:
   a barrier body including an upper portion for lying above a waterline during use and a lower portion for lying below the waterline during use;
   at least one chamber disposed inside the barrier body for receiving a weight or ballast;
   a first barrier connection means in or on a first longitudinal side of the barrier body;
   a second barrier connection means in or on a second longitudinal side of the barrier body; and
   at least one fluid communication means between the at least one chamber and an exterior of the barrier body for, when the barrier unit is deployed in a body of water, allowing water from the body of water into the at least one chamber.

18. The oil spill barrier as claimed in claim 15, in which one of the first barrier units in a given neighbouring pair of first barrier units includes a first retaining member bore or slot, and the other of the first barrier units in the given neighbouring pair of first barrier units includes a second retaining member bore or slot, and one of the one or more retaining members is engaged with or through the first and second retaining member bores or slots for restricting relative movement of the first barrier units in the given neighbouring pair.

* * * * *